2,985,559
Patented May 23, 1961

2,985,559

STABILIZED THERAPEUTIC FERROUS FUMARATE AQUEOUS SUSPENSIONS

Clarence Leonard James Coles, Ealing, London, England, assignor to Glaxo Laboratories Limited, Greenford, Middlesex, England, a British company No Drawing. Filed Jan. 26, 1959, Ser. No. 788,729

Claims priority, application Great Britain Jan. 27, 1958

10 Claims. (Cl. 167—68)

This invention is concerned with improvements in or relating to pharmaceutical compositions, more particularly compositions containing ferrous fumarate.

Various ferrous salts have been proposed for oral administration as sources of iron and for this purpose are frequently made up in the form of aqueous preparations. Such preparations suffer, however, from certain disadvantages, among which may be mentioned the risk of oxidation of the ferrous salts to the ferric states. Thus, for example, ferrous gluconate tends to oxidise at a substantial rate in aqueous solution.

A ferrous salt which shows improvements over ferrous gluconate is ferrous fumarate which may be employed in aqueous suspension. Ferrous fumarate in such suspensions does not oxidise so rapidly as does ferrous gluconate in aqueous suspensions. Ferrous fumarate, however, has a high density and rapidly settles from aqueous suspension; furthermore, agglomeration or impacting of the solid particles often results. This phenomenon gives rise to difficulties in use, in that the agglomerated or impacted solid does not resuspend readily on shaking, for example by the user, before the taking of a dose, with the result, inter alia, that a measured quantity of the liquid may not contain the desired proportion of ferrous fumarate.

It is, therefore, an object of the invention to provide improved aqueous pharmaceutical preparations containing ferrous fumarate, particularly for oral administration.

It has now been found that the tendency in aqueous media of solid ferrous fumarate particles to agglomerate or impact may be reduced by incorporating lecithin therewith. By the use of lecithin, therefore, ferrous fumarate dispersions can be produced wherein the solid particles have little or no tendency to impact, with the result that mere shaking of the dispersion by the consumer will ensure even distribution of the ferrous fumarate throughout the preparation.

According to the invention, therefore, there is provided an aqueous pharmaceutical preparation containing ferrous fumarate in fine particulate form, said preparation also containing lecithin and having reduced tendency to agglomeration or impacting of the ferrous fumarate particles.

The invention also provides a method for preparing an aqueous pharmaceutical preparation containing ferrous fumarate in fine particulate form showing reduced tendency to agglomeration or impacting of the ferrous fumarate particles which comprises dispersing lecithin and finely divided ferrous fumarate in an aqueous medium.

The preparations are preferably so formulated that sufficient lecithin is present substantially to coat the surface of the individual particles of ferrous fumarate.

The preparations according to the invention are suitable for oral administration and may contain compatible adjuvants as required. The particle size of the ferrous fumarate should be as fine as possible so as to permit ready and even suspension on simple shaking, and thus thoroughly milled or micro-pulverised ferrous fumarate is preferably used. The milling may, for example, be carried out by using a swing hammer mill, ball mill, or an abrasive carborundum mill, of which the latter is preferred as, in this case, the ferrous fumarate is ground as a wet slurry and the production of dust, therefore, substantially avoided. The size of the ferrous fumarate particles is preferably such that substantially all of the particles (by weight) are less than $50\mu$.

The proportion of lecithin in the preparations according to the invention will depend upon the proportion of ferrous fumarate present as well as, to some extent, on its particle size, but a proportion of ferrous fumarate of the order of from 1.5–3.5% and a proportion of lecithin of from 0.01–1.5% is generally convenient. A preferred preparation is one containing 2.0–3.0% of ferrous fumarate, advantageously 2.11% and 0.2–1.0% of lecithin, advantageously 1.0%.

The preparations according to the invention preferably contain a hydrophilic colloid, preferably of a non-ionic type, such as methyl cellulose, which is preferably present in a concentration of from 0.1–2.0%, advantageously about 1.5%.

The preparations according to the invention also preferably contain a reducing sugar, such as glucose, corn syrup, maltose or a malt extract.

The preparations according to the invention are preferably thoroughly refined, for example by passage through a small orifice or gap, as, for example, in a homogeniser, to ensure thorough mixing of the components.

The preparations according to the invention show improved stability to oxidation, being oxidised more slowly than ferrous gluconate and ferrous succinate solutions.

In order that the invention may be well understood, the following examples, which describe the formulation of preparations according to the invention, will now be given by way of illustration only.

*Example 1*

The preparation is formulated from the following ingredients:

| | G. |
|---|---|
| Ferrous fumarate [1] | 2.11 |
| Lecithin | 0.12 |
| Liquid glucose, B.P. | 40.00 |
| Sucrose | 40.00 |
| Methyl cellulose | 0.5 |
| Methyl hydroxy benzoate | 0.15 |
| Flavour, q.s. | |
| Colour, q.s. | |
| Water, to 100.00. | |

[1] "Toleron" brand manufactured by the Mallinckrodt Chemical Works.

The methyl hydroxy benzoate is dissolved in 40 ml. of water by heating to 80° C. and the solution cooled to room temperature. The methyl cellulose is then dissolved in this solution by slow stirring after which the lecithin is added and dispersed. A smooth paste is then made of the ferrous fumarate (micro-pulverised) and the liquid glucose which has previously been warmed. This is then added to the aqueous solution and dispersed mechanically. The sucrose is then added and dissolved by stirring, followed by the colour and the flavour components. Sufficient water to yield 100 ml. is then added and the product is passed finally through an efficient homogeniser.

Example 2

The preparation is formulated from the following ingredients:

| | Percent, w./v. |
|---|---|
| Ferrous fumarate | 2.11 |
| Lecithin | 1.0 |
| Liquid glucose | 80.0 |
| Sucrose | 5.0 |
| Methyl cellulose | 1.5 |
| Methyl hydroxy benzoate | 0.1 |
| Flavour, q.s. | |
| Colour, q.s. | |
| Water, to 100. | |

The methyl hydroxy benzoate is dissolved in 35 ml. of water at 80° C. and sprinkled whilst hot onto the surface of the methyl cellulose. The mixture is stirred for five minutes and allowed to stand overnight, the sucrose and liquid glucose added, and the mixture stirred again. The lecithin is rubbed into a paste with a small amount of water and added to the mixture. The ferrous fumarate is then added to 1/10 of this mixture and passed through a colloid mill fitted with carborundum wheels at 0.001" gap. The mill is rinsed with more of the mixture. The concentrated suspension of the ferrous fumarate and the washings are then added to the remainder of the mixture and the volume adjusted by the addition of water.

I claim:

1. A pharmaceutical preparation comprising ferrous fumarate in fine particulate form, water and lecithin in an amount sufficient to substantially reduce the tendency of said ferrous fumarate to agglomerate and become impacted.

2. A preparation as claimed in claim 1 in which said ferrous fumarate is present in a proportion of 1.5–3.5% of the preparation.

3. A preparation as claimed in claim 2 in which said ferrous fumarate is present in a proportion of 2.0–3.0% of the preparation.

4. A preparation as claimed in claim 2 in which substantially all of said ferrous fumarate has a particle size less than $50\mu$.

5. A preparation as claimed in claim 4 in which said lecithin is present in a proportion of 0.01–1.5% of the preparation.

6. A preparation as claimed in claim 5 in which said lecithin is present in a proportion of 0.2–1.0% of the preparation.

7. A pharmaceutical preparation comprising 1.5–3.5% of ferrous fumarate in fine particulate form, water, 0.1–2.0% of a non-ionic hydrophylic colloid and 0.01–1.5% of lecithin, said lecithin substantially reducing the tendency of said ferrous fumarate to agglomerate and become impacted.

8. A preparation as claimed in claim 7 in which said hydrophylic colloid is methyl cellulose.

9. A pharmaceutical preparation comprising 1.5–3.5% of ferrous fumarate in fine particulate form, water, 0.1–2.0% of a non-ionic hydrophylic colloid, a reducing sugar, and 0.01–1.5% of lecithin, said lecithin substantially reducing the tendency of said ferrous fumarate to agglomerate and become impacted.

10. The preparation of claim 9 in which the reducing sugar is selected from the group consisting of glucose, corn syrup, maltose and a malt extract.

References Cited in the file of this patent

UNITED STATES PATENTS

| | | |
|---|---|---|
| 2,745,785 | Bruce et al. | May 15, 1956 |
| 2,749,274 | Buckwalter | June 5, 1956 |
| 2,793,156 | Souler | May 21, 1957 |
| 2,848,366 | Bertsch | Aug. 19, 1958 |

FOREIGN PATENTS

| | | |
|---|---|---|
| 669,709 | Great Britain | Apr. 9, 1952 |